(12) United States Patent
Hamerton (10) Patent No.: US 10,455,803 B2
(45) Date of Patent: Oct. 29, 2019

(54) SUPPORT ARM ASSEMBLY AND MILKING PARLOUR

(71) Applicant: DELAVAL HOLDING AB, Tumba (SE)

(72) Inventor: Lance Hamerton, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 370 days.

(21) Appl. No.: 15/519,434

(22) PCT Filed: Oct. 15, 2015

(86) PCT No.: PCT/SE2015/051091
§ 371 (c)(1),
(2) Date: Apr. 14, 2017

(87) PCT Pub. No.: WO2016/060608
PCT Pub. Date: Apr. 21, 2016

(65) Prior Publication Data
US 2017/0223919 A1    Aug. 10, 2017

(30) Foreign Application Priority Data
Oct. 17, 2014  (SE) ...................................... 1451246

(51) Int. Cl.
*A01J 5/017*  (2006.01)
*A01K 1/12*  (2006.01)

(52) U.S. Cl.
CPC ............ *A01J 5/0175* (2013.01); *A01J 5/017* (2013.01); *A01K 1/12* (2013.01)

(58) Field of Classification Search
CPC ............ A01J 5/017; A01J 5/0175; A01K 1/12
See application file for complete search history.

(56) References Cited

U.S. PATENT DOCUMENTS 3,738,321 A    6/1973  Hicks
3,938,470 A  *  2/1976  Pace ...................... A01J 5/017
                                                                    119/14.1
(Continued)

FOREIGN PATENT DOCUMENTS

GB    1 336 458 A    11/1973
GB    2 307 393 A     5/1997
(Continued)

OTHER PUBLICATIONS

International-Type Search Report, dated May 20, 2015, from corresponding PCT application.
(Continued)

*Primary Examiner* — Monica L Williams
(74) *Attorney, Agent, or Firm* — Young & Thompson (57) ABSTRACT

A support arm assembly for milking equipment is disclosed which includes a pivotable support arm and a stationary arm suspension configured to support the pivotable support arm. The pivotable support arm includes an elongated arm member configured to support a milking cluster of the milking equipment at a distal end portion thereof. The elongated arm member is pivotable in a first direction and an opposite second direction in a substantially horizontal plane. The support arm assembly also includes a holding device configured to maintain the elongated arm member in a first pivotal position when the elongated arm member is subjected to a pivotal force smaller than a threshold force. Further a milking parlor is disclosed.

16 Claims, 9 Drawing Sheets

(56) References Cited

U.S. PATENT DOCUMENTS

| | | |
|---|---|---|
| 4,228,763 A | 10/1980 | Heidecker et al. |
| 6,382,130 B1 | 5/2002 | Rooney |
| 2004/0200421 A1* | 10/2004 | Andersson ............ A01J 5/0175 |
| | | 119/14.1 |
| 2015/0296737 A1 | 10/2015 | Krone et al. |
| 2017/0086419 A1* | 3/2017 | Krone ...................... A01K 1/12 |

FOREIGN PATENT DOCUMENTS

| | | |
|---|---|---|
| WO | 98/31212 A1 | 7/1998 |
| WO | 01/70014 A1 | 9/2001 |
| WO | 2011/039739 A1 | 4/2011 |
| WO | 2013/135832 A1 | 9/2013 |
| WO | 2014/120072 A1 | 8/2014 |

OTHER PUBLICATIONS

International Search Report, dated Jan. 15, 2016, from corresponding PCT application.

* cited by examiner

SUPPORT ARM ASSEMBLY AND MILKING PARLOUR

TECHNICAL FIELD

The present invention relates to a support arm assembly for milking equipment. The present invention further relates to a milking parlour comprising such a support arm assembly.

BACKGROUND

WO 2014/120072 discloses a milking device comprising a support device for supporting a milking member having a claw and a number of teatcups to be attached to a respective teat of an animal. The support device comprises a rear portion, comprising attachment means for attaching the support device to a structure, and an arm section having a proximal end portion attached to the rear portion and a distal end portion movable between an active position in the proximity of the animal to be milked and a rest position. A first cavity extends along the arm section and houses a retracting member for retracting the milking member from the teats of the animal. A second cavity for conveying a fluid flow extends along the arm section. The arm section comprises an extruded part enclosing the first cavity and the second cavity. The arm section may be freely swung back and forth in a milking parlour such that the teatcups may be attached to teats of animals standing on both sides of the milking parlour.

SUMMARY

It is an object of the present invention to provide a support arm assembly, which ensures a reliable positioning of a milking cluster supported by the support arm assembly.

According to an aspect of the invention, the object is achieved by a support arm assembly for milking equipment, the support arm assembly comprising a pivotable support arm and a stationary arm suspension for supporting the pivotable support arm. The pivotable support arm comprises a first pivot member and an elongated arm member having a distal end portion and a proximal end portion, and the stationary arm suspension comprises a second pivot member. The elongated arm member is configured to support a milking cluster of the milking equipment at the distal end portion and the first pivot member is connected to the proximal end portion. The first pivot member and the second pivot member interact to permit the distal end portion of the elongated arm member to be pivoted in a first direction and an opposite second direction in a substantially horizontal plane. The support arm assembly comprises a holding device configured to maintain the elongated arm member in a first pivotal position when the elongated arm member is subjected to a pivotal force smaller than a threshold force in the first direction or the second direction.

Since the holding device is configured to maintain the elongated arm member in the first pivotal position when the elongated arm member is subjected to a pivotal force smaller than a threshold force in the first direction or the second direction, the elongated arm member is held in the first pivotal position and the milking cluster is positioned at the first pivotal position even if the elongated arm member is subjected to a pivotal force, i.e. a pivotal force smaller than the threshold force. As a result, the elongated arm member remains at the first pivotal position, and the above mentioned object is achieved.

When the elongated arm member is to be pivoted from the first pivotal position, milking personnel may subject the elongated arm member to a pivotal force larger than the threshold force.

The support arm assembly is configured for use in a milking parlour. The support arm assembly may be used in a so-called midi line arrangement, where a collection milk conduit of the milking equipment extends along a middle of a milking pit and the milking cluster on the elongated arm member is swung between a first side of the milking pit and an opposite second side of the milking pit. The stationary arm suspension may be configured for attachment to a stationary supporting member in a milking parlour. The elongated arm member may be configured to be swung between the first pivotal position and one or more further pivotal positions. The milking cluster may comprise a milking claw and at least two teat cups. The milking claw may be connected to a milk conduit and a pulsation conduit. Portions of the milk conduit and the pulsation conduit may be supported by the elongated arm member. The milk conduit and/or the pulsation conduit may extend through at least a portion of the elongated arm member. A cavity may extend along the elongated arm member and may house a retracting member for retracting the milking claw and the teat cups from the teats of an animal to the elongated arm member. The elongated arm member may comprise an extruded part forming the cavity and optionally forming one or more further cavities.

According to embodiments, the holding device may comprise a stopping device preventing the elongated arm member from being pivoted beyond a first pivotal position in the first direction. In this manner the elongated arm member may only be pivoted from the first pivotal position in the second direction, upon subjecting the elongated arm member to a pivotal force larger than the threshold force in the second direction. Due to the stopping device, in the first pivotal position the elongated arm member is securely positioned also when subjected to a pivotal force larger than the threshold force in the first pivotal direction. Thus, the elongated arm member may be held dependably in the first pivotal position, e.g. during milking with the milking cluster of an animal standing at one side of a relevant milking parlour, and/or during teat cup attachment and retraction.

According to embodiments, the stopping device may comprise a stop mechanism connected to the pivotable support arm and a stop element connected to the stationary arm suspension, the stop mechanism being configured to interact with the stop element. In this manner the stop mechanism and the stop element may provide a distinct pivotal end position at the first pivotal position.

According to embodiments, the holding device may be configured to release the elongated arm member from the first pivotal position when the elongated arm member is subjected to a pivotal force higher than the threshold force in the second direction. In this manner the elongated arm member may be swung from the first pivotal position, e.g. towards a second pivotal position.

According to embodiments, the holding device may comprise a first holding element and a second holding element, wherein the first holding element may be connected to the pivotable support arm or the stationary arm suspension and comprises a magnet member. The second holding element may be connected to the other of the pivotable support arm and the stationary arm suspension and comprises a magnetic material member. The magnetic member abuts against the magnetic material member in the first pivotal position, and wherein an attraction force between the magnet member and the magnetic material member corresponds to the threshold force. In this manner the threshold force required to be exceeded in order to pivot the elongated arm member from the first pivotal position may be provided by the magnet and the magnetic material member.

According to embodiments, the holding device may comprise a first holding element and a second holding element, wherein the first holding element may be connected to the pivotable support arm or the stationary arm suspension and comprises a resilient member, wherein the second holding element may be connected to the other of the pivotable support arm and the stationary arm suspension and may comprise an engagement member. The resilient member may engage with the engagement member or vice versa in the first pivotal position. An engaging force between the resilient member and the engagement member corresponds to the threshold force. In this manner the threshold force required to be exceeded in order to pivot the elongated arm member from the first pivotal position may be provided by an engagement between the resilient member and the engagement member.

According to embodiments, the holding device may comprise a tension spring connected to the pivotable support arm and the stationary arm suspension. The stop mechanism may abut against the stop element in the first pivotal position. The tension spring may bias the pivotable support arm in the first direction. A biasing force provided by the tension spring in the first direction may correspond to the threshold force. In this manner the threshold force required to be exceeded in order to pivot the elongated arm member from the first pivotal position may be provided by the tension spring.

According to embodiments, the stopping device may further prevent the elongated arm member from being pivoted beyond a second pivotal position in the second direction. The holding device may be configured to maintain the elongated arm member in the second pivotal position when the elongated arm member is subjected to a pivotal force in the first direction smaller than a threshold force, at which threshold force the holding device releases the elongated arm member from the second pivotal position. In this manner two pivotal end positions of the elongated arm member may be provided.

According to embodiments, the stop mechanism may comprise a first abutment part associated with the first pivotal position and a second abutment part associated with the second pivotal position. Distinct pivotal end positions may be provided at the first and second pivotal positions by the first and second abutment parts, respectively. The distinct pivotal end positions may be provided by the first and second abutment parts abutting against the stop element connected to the stationary arm suspension. Well defined positions for the elongated arm member may thus be provided at the first and second pivotal positions. Such well-defined positions ensure a proper alignment of the elongated arm member with the milking cluster inter alia during milking of an animal.

According to embodiments, the first and second abutment parts may be individually positionable along the first and second directions. In this manner the first and second pivotal positions of the elongated arm member may be set for a relevant milking parlour. That is, the first and second pivotal positions may be set by positioning the first and second abutment parts along the first and second directions in a relevant milking parlour. Each milking parlour may require its particular position of the first and second abutment parts to ensure a proper alignment of the elongated arm member with the milking cluster during milking of an animal.

According to a further aspect of the invention there is provided a milking parlour comprising: milking equipment, a milking pit, a first stalling arrangement for holding at least one animal during milking at a first side of the milking pit, a second stalling arrangement for holding at least one animal at an opposite second side of the milking pit, and a supporting member arranged centrally in the milking pit. The milking parlour further comprises a support arm assembly according to any aspect and/or embodiment disclosed herein. The stationary arm suspension is arranged centrally in the milking pit with the second pivot member connected to the supporting member.

Since the elongated arm member of the support arm assembly is maintained in the first pivotal position when subjected to forces less than the threshold force, the above discussed advantages are achieved.

Moreover, in some types of milking equipment one or more functions may be triggered by swinging of the elongated arm from the first position. By maintaining the elongated arm member in the first pivotal position, accidental triggering of such milking equipment functions may be avoided. For instance, accidental starting of a milking vacuum may be avoided, i.e. accidental starting of a milking vacuum triggered by swinging of the elongated arm member from the first pivotal position towards the second pivotal position may be avoided.

According to embodiments, the first and second stalling arrangements may be herringbone stalling arrangements. The first and second abutment parts of the stop mechanism may be positioned to provide an angle within a range of 90-150 degrees between the first and second pivotal positions. In this manner the first and second pivotal positions may be provided by the first and second abutment parts at positions corresponding to an angle, suitable for animals standing in the herringbone stalling arrangements.

According to embodiments, the first and second stalling arrangements may be parallel stalling arrangements. The first and second abutment parts of the stop mechanism may be positioned to provide an angle of approximately 180 degrees between the first and second pivotal positions. In this manner the first and second pivotal positions may be provided by the first and second abutment parts at positions suitable for animals standing in the parallel stalling arrangements.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1A:
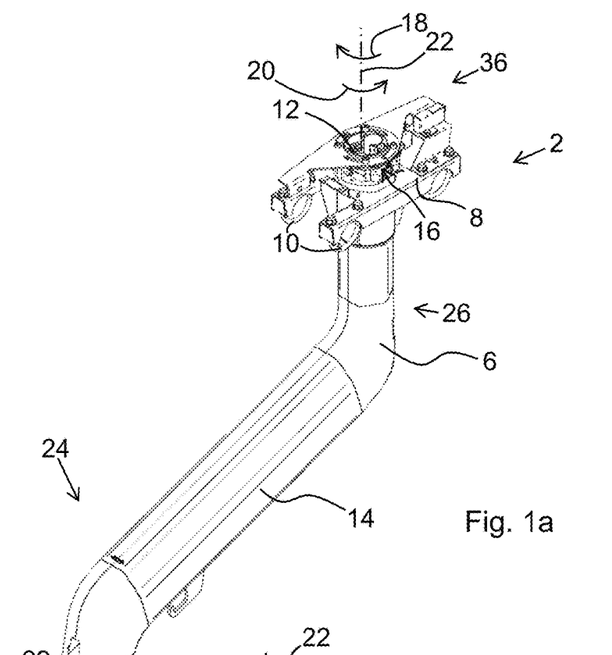
FIGS. 1a and 1b illustrate a support arm assembly according to embodiments.
Figure 1B:
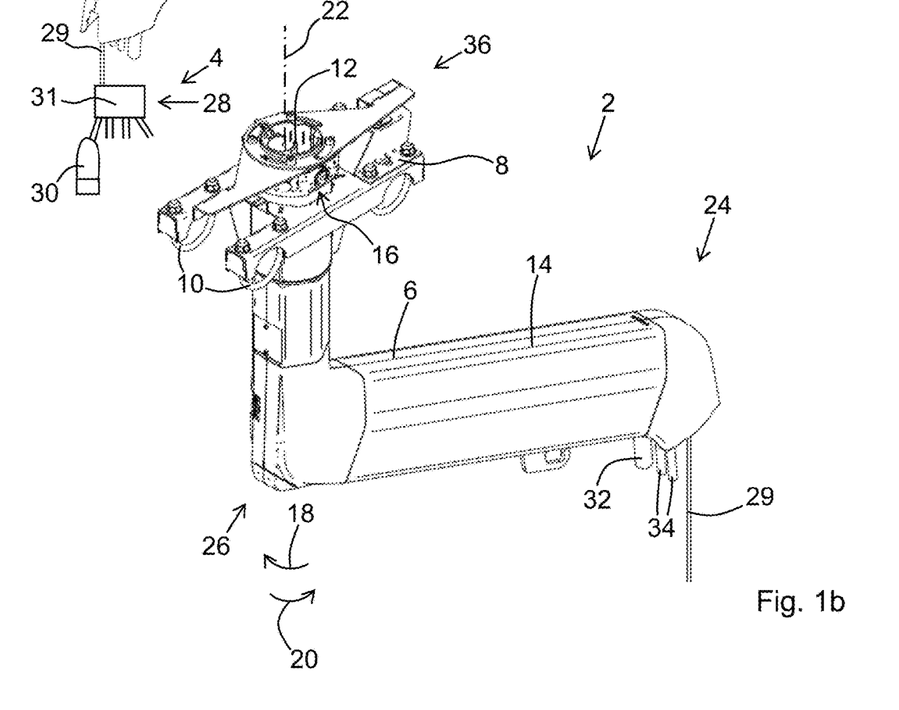

FIGS. 1a and 1b illustrate a support arm assembly 2 according to embodiments. The support arm assembly 2 is configured to support milking equipment 4 of a milking machine. The milking machine may be an ordinary vacuum milking machine utilising pulsating vacuum in a teatcup. The support arm assembly 2 comprises a pivotable support arm 6 and a stationary arm suspension 8. The stationary arm suspension 8 supports the pivotable support arm 6. The stationary arm suspension 8 may be attached e.g. to a supporting member or members in a milking parlour by means of a clamps 10. The supporting member forms a stationary structure of the milking parlour.

The pivotable support arm 6 comprises a first pivot member 12 and an elongated arm member 14. The stationary arm suspension 8 comprises a second pivot member 16. The first pivot member 12 and the second pivot member 16 interact to permit the elongated arm member 14 to be pivoted in a first direction 18 and an opposite second direction 20, illustrated by arrows in FIGS. 1a and 1b. That is, the first pivot member 12 is pivotably arranged in the second pivot member 16. Thus, the elongated arm member 14 is pivotable about a pivot axis 22 in the first direction 18 and the second direction 20. The pivot axis 22 extends substantially vertically when the support arm assembly 2 is arranged in a relevant milking parlour. The elongated arm member 14 may extend in a substantially horizontal plane, or as in the embodiments of FIGS. 1a and 1b, the elongated arm member 14 may extend at an angle to the substantially horizontal plane.

The elongated arm member 14 has a distal end portion 24 and a proximal end portion 26. The elongated arm member 14 is configured to support a milking cluster 28 of the milking equipment 4 at the distal end portion 24. The first pivot member 12 is connected to the proximal end portion 26 of the elongated arm member 14.

In FIG. 1a the milking cluster 28 is schematically illustrated and is connected to the elongated arm member 14 via a cord 29. The milking cluster 28 comprises a milking claw 31 connected to four teat cups 30, one of which is shown in FIG. 1a. The milking claw 31 is further connected to a milk conduit 32, and to two vacuum conduits 34, the ends of which are schematically illustrated in FIG. 1b. The milk and vacuum conduits extend through the elongated arm member 14. In FIG. 1b the milking cluster 28 has been pulled out from the elongated arm member 14 in order for the teatcups to be attached to the teats of an animal to be milked by milking personnel. The cord 29 has been extracted from the elongated arm member 14. After completion of milking a relevant animal the milking cluster 28 is retracted by the cord 29 to the distal end portion 24 of the elongated arm member 14. For this purpose the support arm assembly 2 may comprise a retracting member as disclosed in WO 2014/120072. In alternative embodiments there may be only two teatcups connected to a milking claw of a milking cluster. The elongated arm member 14 may comprises an extruded part forming one or more further cavities therein.

The first pivot member 12 and the second pivot member 16 interact to permit the distal end portion 24 of the elongated arm member 14 to be pivoted in the first direction 18 and the opposite second direction 20 in a substantially horizontal plane. The substantially horizontal plane extends substantially perpendicularly to the pivot axis 22 when the support arm assembly 2 is arranged in a relevant milking parlour. The support arm assembly 2 comprises a holding device 36 configured to maintain the elongated arm member 14 in a first pivotal position when the elongated arm member 14 is subjected to a pivotal force smaller than a threshold force in the first direction 18 or the second direction 20. In FIG. 1a the elongate arm member 14 is shown in the first pivotal position.

Figure 2A:
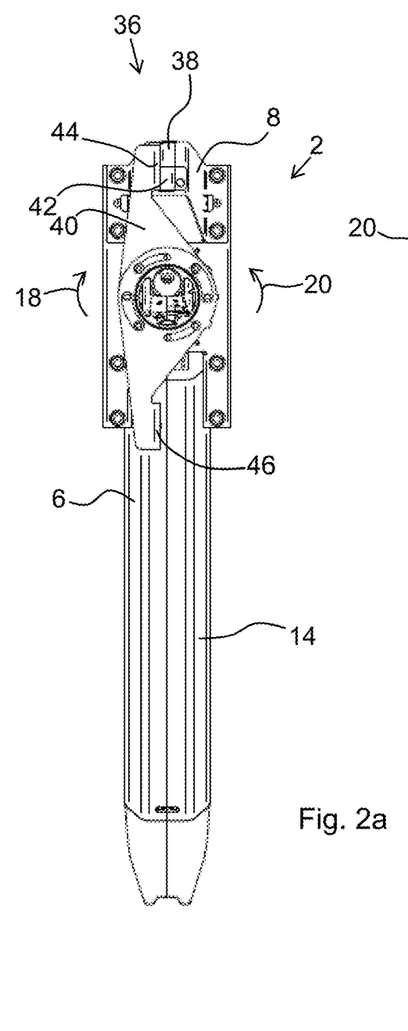
FIGS. 2a and 2b illustrate top views of the support arm assembly of FIGS. 1a and 1b.
Figure 2B:
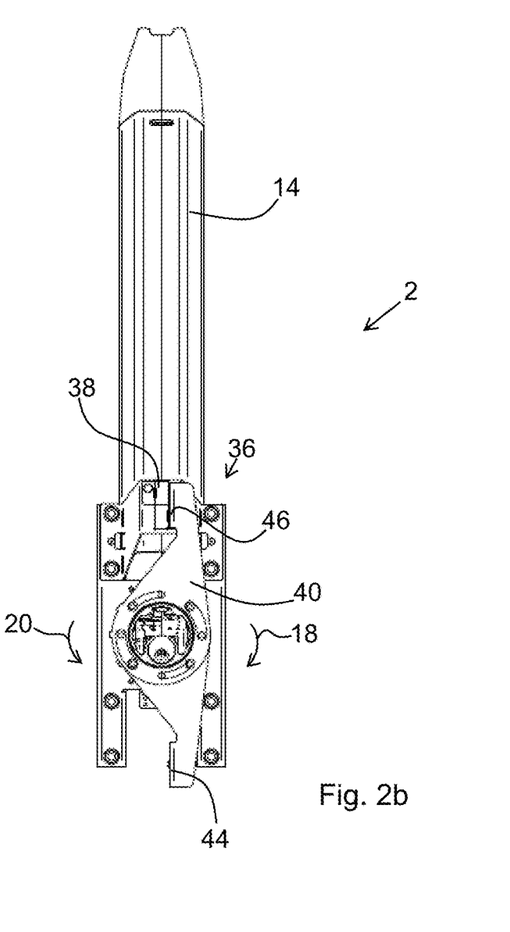

FIGS. 2a and 2b illustrate top views of the support arm assembly 2 of FIGS. 1a and 1b. In FIG. 2a the elongated arm member 14 is shown in the first pivotal position and in FIG. 2b the elongated arm member 14 is shown in a second pivotal position. As illustrated in FIGS. 2a and 2b the first and second pivotal positions are arranged as they are in a parallel milking parlour, see FIG. 8

The holding device 36 comprises a first holding element 38 and a second holding element 40. The first holding element 38 is connected to the stationary arm suspension 8 and comprises a magnet member 42. The second holding element 40 is connected to the pivotable support arm 6 and thus, pivots with the elongated arm member 14. The second holding element 40 comprises a magnetic material member 44. The magnetic member 42 abuts against the magnetic material member 44 in the first pivotal position, see FIG. 2a. An attraction force between the magnet member 42 and the magnetic material member 44 corresponds to the threshold force. The magnetic member 42 may comprise e.g. a permanent magnet. The magnetic material member 44 may comprise e.g. a magnetic stainless steel alloy or a ferritic magnetic material. In alternative embodiments, the first holding element may comprise a magnetic material member and the second holding element may comprise a magnet member.

The holding device 36 maintains the elongated arm member 14 in the first pivotal position when the elongated arm member 14 is subjected to a pivotal force smaller than a threshold force in the second direction 20. The holding device 36 releases the elongated arm member 14 from the first pivotal position when the elongated arm member 14 is subjected to a pivotal force higher than the threshold force, in the second direction 20. Thus, when the threshold force is exceeded by milking personnel pushing against the elongated arm member 14 in the second direction 20, the elongated arm member 14 is pivoted from the first pivotal position.

The elongated arm member 14 has a second pivotal position, as shown in FIG. 2b. Accordingly, in these embodiments the holding device 36 is configured to maintain the elongated arm member 14 in the second pivotal position when the elongated arm member 14 is subjected to a pivotal force in the first direction 18 smaller than a threshold force. The second holding element 40 comprises a further magnetic material member 46. In the second pivotal position attraction force between the magnet member 42 and the further magnetic material member 46 corresponds to the threshold force. The threshold force in the second pivotal position may be of similar strength as the threshold force in the first pivotal position. If the threshold force is exceeded by milking personnel pushing against the elongated arm member 14, the holding device 36 releases the elongated arm member 14 from the second pivotal position, and the elongated arm member 14 may be pivoted back to the first pivotal position. Accordingly, the elongated arm member 14 is configured to be swung between the first pivotal position and the second pivotal positions in a relevant milking parlour.

The holding device 36 as such is configured to maintain the elongated arm member 14 in the first pivotal position and/or the second pivotal position by an engagement between the first and second holding elements 38, 40 as long as the elongated arm 14 is not subjected to a force exceeding the threshold force. In its broadest scope, the present invention encompasses that the elongated arm 14 may be pivoted from both the first and second pivotal positions in both the first and second directions, if the threshold force is exceeded.

However, to provide a distinct first pivotal position and/or in order to prevent excessive twisting of the milk and vacuum conduits, the holding device 36 may comprise a stopping device preventing the elongated arm member 14 from being pivoted beyond the first pivotal position in the first direction 18.

Figure 3:
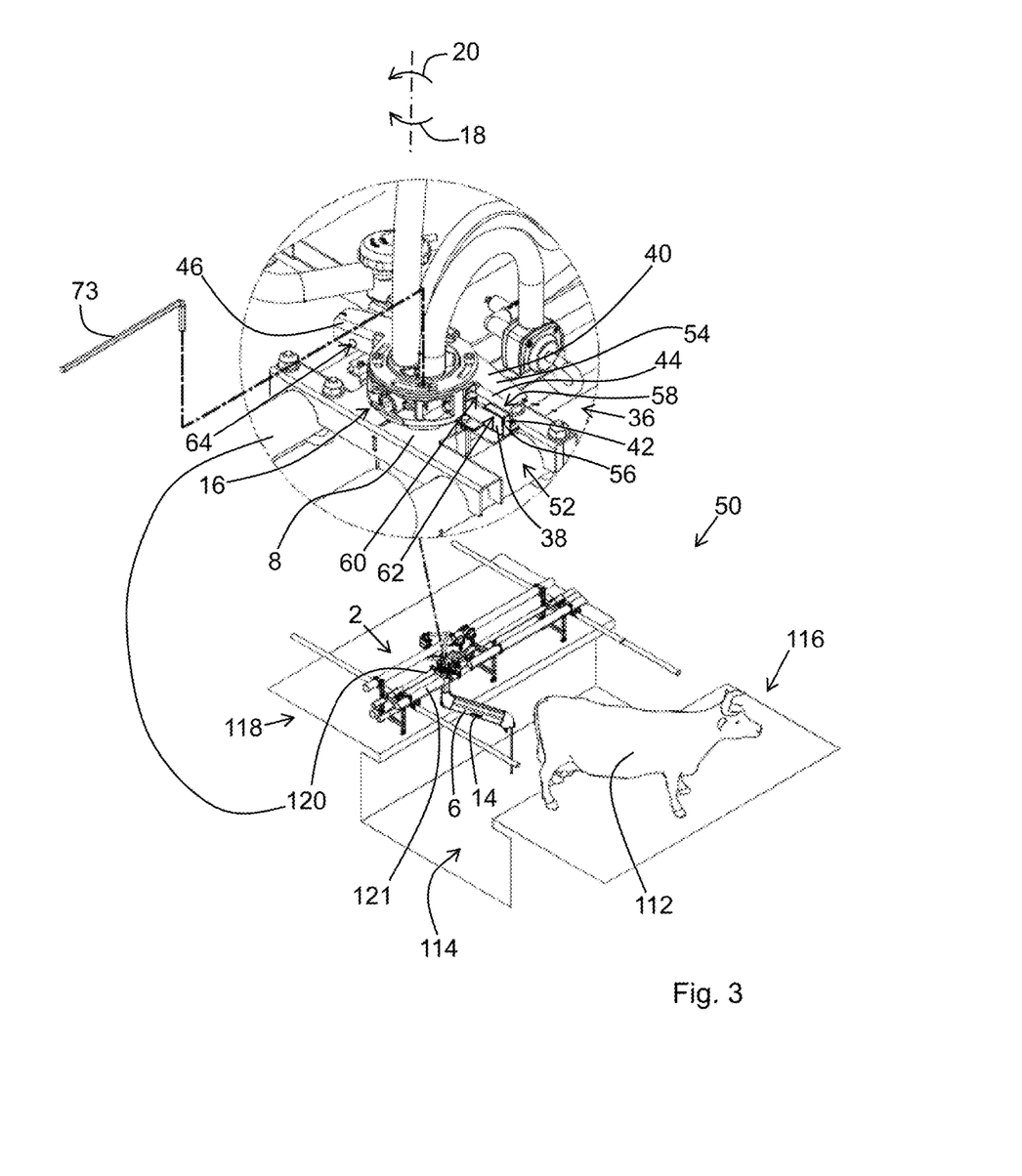
FIG. 3 illustrates a portion of a milking parlour according to embodiments.

FIG. 3 illustrates a portion of a milking parlour 50 according to embodiments. The milking parlour 50 comprises a support arm assembly 2 as discussed in connection with FIGS. 1a-2b. A partial enlargement of FIG. 3 illustrates inter alia the holding device 36.

The holding device 36 comprises a stopping device 52 preventing the elongated arm member 14 from being pivoted beyond the first pivotal position in the first direction 18. In FIG. 3 the elongated arm member 14 is shown in the first pivotal position. The stopping device 52 comprises a stop mechanism 54 connected to the pivotable support arm 6 and a stop element 56 connected to the stationary arm suspension 8. The stop mechanism 54 is configured to interact with the stop element 56.

In these embodiments the stop element 56 comprises a first abutment surface 58 and the stop mechanism 54 comprises a second abutment surface 60. The first abutment surface 58 is provided at the first holding element 38, e.g. as exemplified at the magnetic member 42. The second abutment surface 60 is provided at the second holding element 40, e.g. as exemplified at the magnetic material member 44. In the first pivotal position the first abutment surface 58 abuts against the second abutment surface 60 and provides a distinct pivotal end position at the first pivotal position since the first holding element 38 is fixedly connected to the stationary arm suspension 8.

The stopping device 52 further prevents the elongated arm member 14 from being pivoted beyond a second pivotal position in the second direction 20. Accordingly, the stop element 56 comprises a third abutment surface 62 and the stop mechanism 54 comprises a fourth abutment surface 64. The third abutment surface 62 is provided at the first holding element 38, e.g. as exemplified at the magnetic member 42. The fourth abutment surface 64 is provided at the second holding element 40, e.g. as exemplified at the further magnetic material member 46. In the second pivotal position the third abutment surface 62 abuts against the fourth abutment surface 64 and provides a distinct pivotal end position at the second pivotal position.

The milking parlour 50 comprises milking equipment comprising inter alia conduits and milking clusters, a milking pit 114, a first stalling arrangement (not shown) for holding at least one animal 112 during milking at a first side 116 of the milking pit 114, a second stalling arrangement (not shown) for holding at least one animal (not shown) at an opposite second side 118 of milking pit 114, and a supporting member 120 arranged centrally in the milking pit 114. As mentioned above, the milking parlour 50 comprises a support arm assembly 2. The stationary arm suspension 8 of the support arm assembly 2 is arranged centrally in the milking pit 114 connected to the supporting member 120. Thus, the second pivot member 16 is connected to the supporting member 120.

Accordingly, the milking parlour 50 is provided with a so-called midi line arrangement, where a collection milk conduit 121 of the milking equipment extends along a middle of a milking pit 114. The elongated arm member 114 is swung between the first pivotal position and the second pivotal position pointing to the first side 116 or the second side 118 of the milking pit 114 and for attaching the teat cups of the milking claw (not shown) to teats of animals 112 alternately on the first side 116 and the second side 118 of the milking pit 114.

Figure 4:
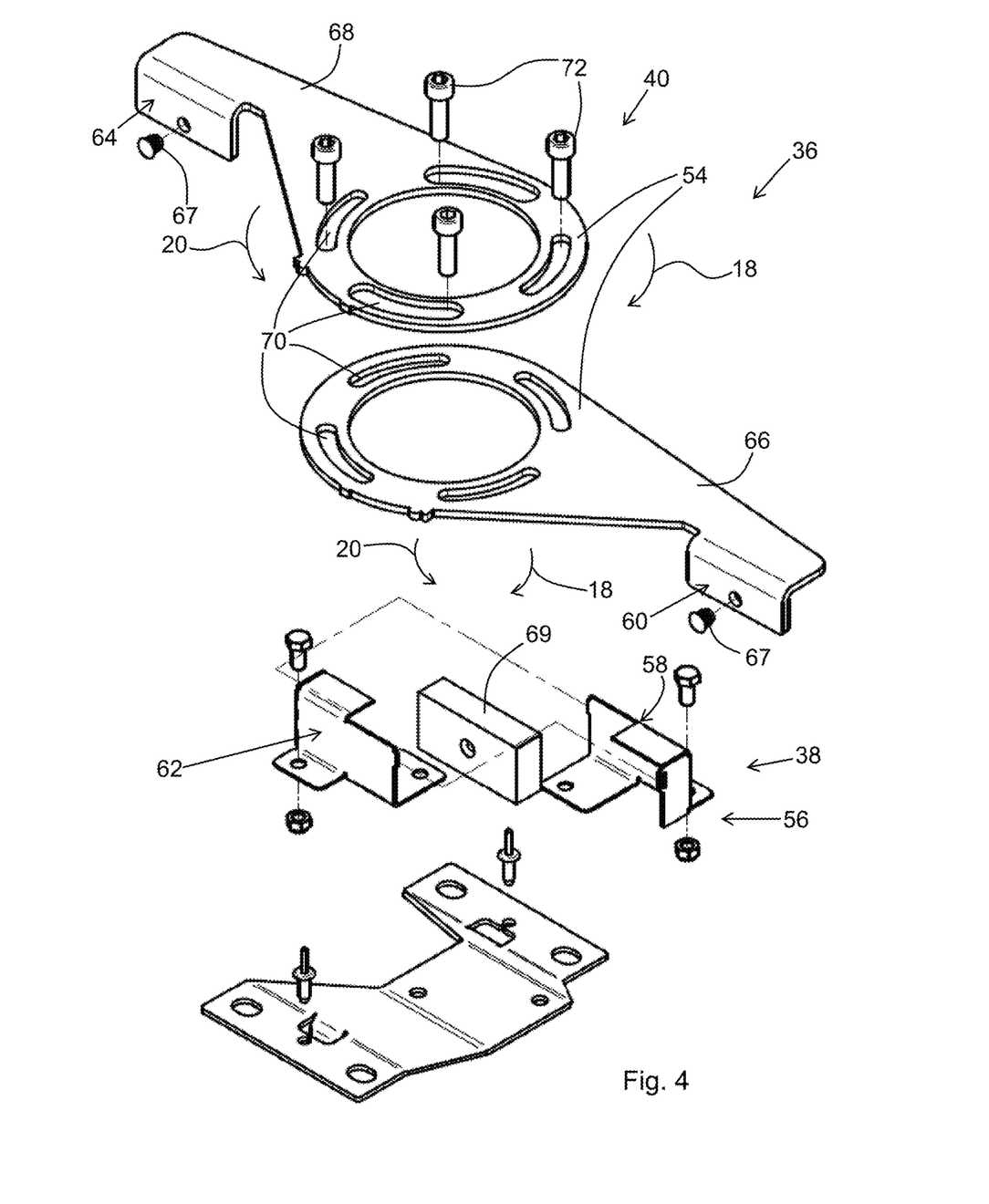
FIG. 4 illustrates a portion of a holding device in an exploded view.

FIG. 4 illustrates a portion of the holding device 36 of FIGS. 1a-3 in an exploded view. The stop mechanism 54 of the stopping device 52 comprises a first abutment part 66 and a second abutment part 68. The first abutment part 66 is associated with the first pivotal position. The second abutment part 68 is associated with the second pivotal position. Accordingly, the first abutment part 66 comprises the second abutment surface 60 and the second abutment part 68 comprises the fourth abutment surface 64. The first holding element 38 of the holding device 36 comprises a permanent magnet 69 and the stop element 56 with the first and third abutment surfaces 58, 62. Resilient elements 67 may be provided in the second and fourth abutment surfaces 60, 64 to dampen impacts between the first and second, as well as between the third and fourth abutment surfaces 58, 60, 62, 64. Portions of the resilient elements 67 form part of the second and fourth abutment surfaces 60, 64.

The second holding element 40 of the holding device 36 comprises the first and second abutment parts 66, 68. The first and second abutment parts 66, 68 are individually positionable along the first and second directions 18, 20. For this purpose the first and second abutment parts 66, 68 are provided with slots 70, through which bolts 72 extend. Distinct pivotal end positions, and thus well-defined positions for the elongated arm member, are provided at the first and second pivotal positions by the first and second abutment parts 66, 68, respectively. Accordingly, the first and second pivotal positions of the elongated arm member may be set to ensure a proper alignment of the elongated arm member with the milking cluster during milking of an animal.

Once the first and second abutment parts 66, 68 have been positioned in the first and second directions 18, 20 to provide suitable first and second pivotal positions in a relevant milking parlour, the bolts 72 are tightened with e.g. an allen wrench 73, as indicated in the partial enlargement of FIG. 3.

Figure 5A:
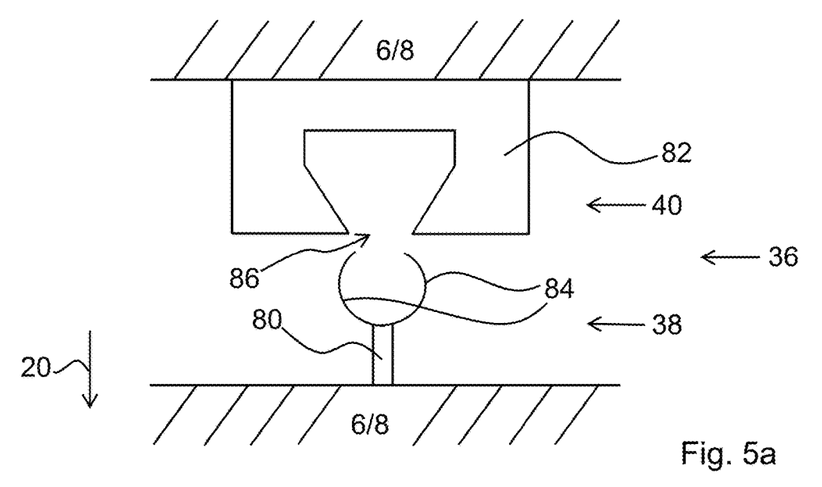
FIGS. 5a-5c illustrate embodiments of holding devices.
Figure 5B:
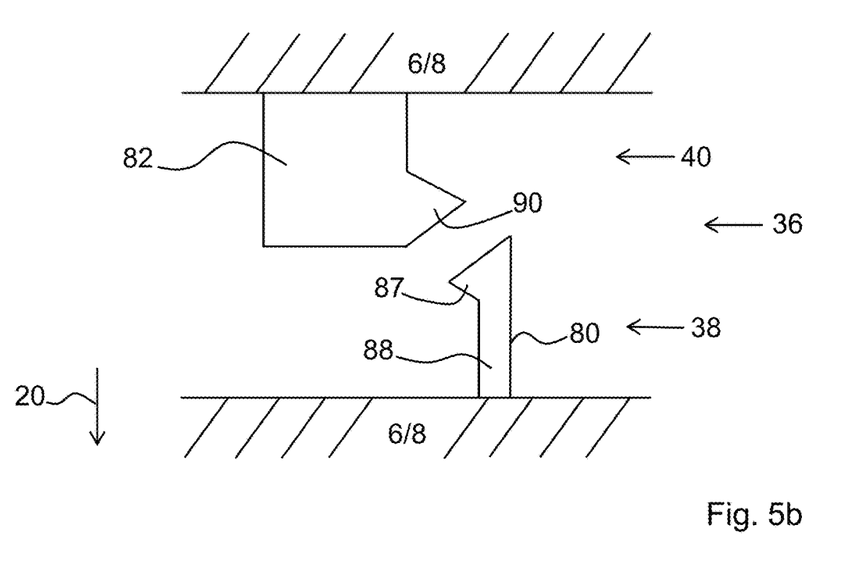
Figure 5C:
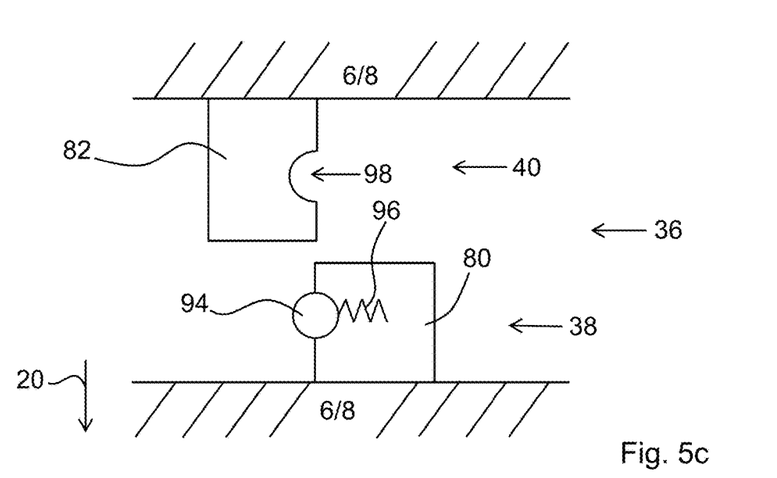

FIGS. 5a-5c illustrate embodiments of holding devices 36. The holding devices 36 of these embodiments may be used in support arm assemblies 2 as discussed with reference to FIGS. 1a-3 instead of the magnetic holding device.

Each of the holding devices 36 comprises a first holding element 38 and a second holding element 40. The first holding element 38 is connected to the pivotable support arm 6 or to the stationary arm suspension 8. The second holding element 40 is connected to the other of the pivotable support arm 6 and the stationary arm suspension 8.

Each of the first holding elements 38 comprises a resilient member 80. Each of the second holding elements 40 comprises an engagement member 82. In these embodiments each of the resilient members 80 engages mechanically with the engagement member 82 instead of magnetically. The engagement between the resilient member 80 and the engagement member 82 may be provided at the first pivotal position, and in a similar manner at the second pivotal position. An engaging force between the resilient member 80 and the engagement member 82 corresponds to a threshold force. The threshold force has to be exceeded in order to pivot the elongated arm member from the first pivotal position in the second direction 20, as exemplified in FIGS. 5a-5c, as well as from the second pivotal position in the first direction.

In the embodiments of FIG. 5a the resilient member 80 comprises two resilient parts 84 which are forced towards each other when pushed into a narrow opening 86 of the engagement member 82. Having passed the narrow opening 86, the resilient parts 84 resume their initial position inside the engagement member 82 and prevent the resilient member 80 from being separated from the engagement member 82, unless the threshold force is exceeded.

In the embodiments of FIG. 5b the resilient member 80 comprises a first protruding portion 87 arranged at an end of a flexible arm 88. When the first protruding portion 87 is pushed passed a second protruding portion 90 of the engagement member 82, the flexible arm 88 gives way, whereafter the flexible arm 88 resumes its initial position. The first and second protruding portions 87, 90 prevent the resilient member 80 from being separated from the engagement member 82, unless the threshold force is exceeded.

In the embodiments of FIG. 5c the resilient member 80 comprises a spring biased ball 94. The ball 94 is forced against the force of a spring 96 into a body of the resilient member 80 when the ball 94 is brought to abut against a wall portion of the engagement member 82. Reaching a recess 98 in the engagement member 82, the ball 94 will be biased partially into the recess 98 thus, preventing the resilient member 80 from being separated from the engagement member 82, unless the threshold force is exceeded.

Figure 6:
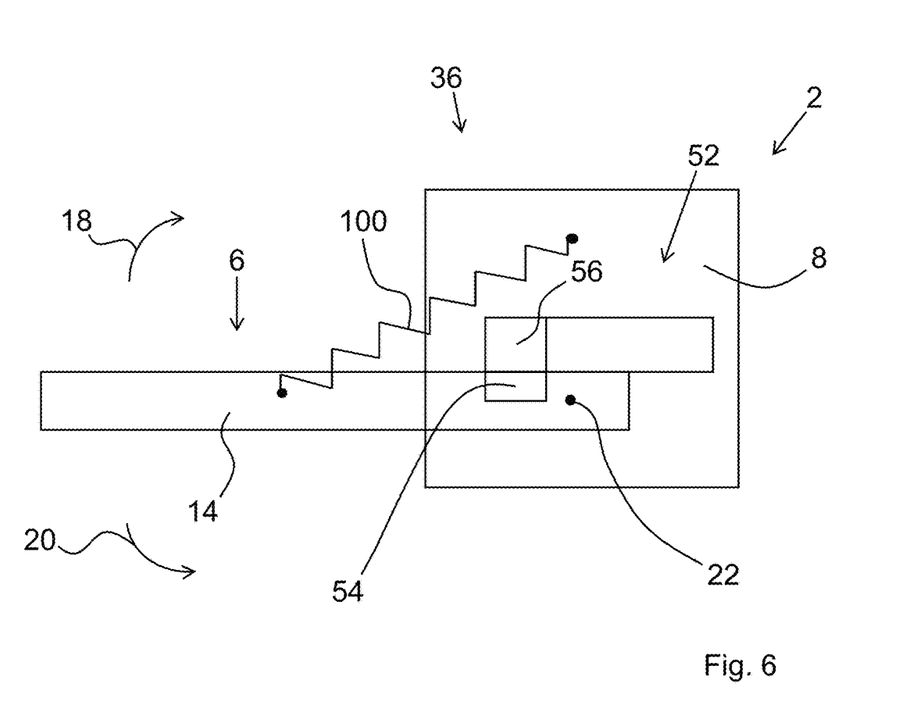
FIG. 6 illustrates schematically a support arm assembly according to embodiments in a top view.

FIG. 6 illustrates schematically a support arm assembly 2 according to embodiments in a top view. The support arm assembly 2 resembles in much the support arm assembly of the embodiments of FIGS. 1a-3 but comprises a holding device 36 comprising a spring instead of the magnetic holding device.

The holding device 36 comprises a tension spring 100 connected to the pivotable support arm 6 and the stationary arm suspension 8, i.e. one end of the tension spring 100 is connected to pivotable support arm 6 and the opposite end of the tension spring 100 is connected to the stationary arm suspension 8. The holding device 36 further comprises a stopping device 52 preventing the elongated arm member 14 from being pivoted beyond the first pivotal position in the first direction 18. In FIG. 6 the elongated arm member 14 is shown in the first pivotal position. The stopping device 52 comprises a stop mechanism 54 connected to the pivotable support arm 6 and a stop element 56 connected to the stationary arm suspension 8.

The stop mechanism 54 abuts against the stop element 56 in the first pivotal position. The tension spring 100 biases the pivotable support arm 6 in the first direction 18, because the end of the tension spring 100 connected to the pivotable support arm 6 is connected to the pivotable support arm 6 at a distance from the pivot axis 22 of the elongated arm member 14. A biasing force provided by the tension spring 100 in the first direction 18 corresponds to the threshold force.

When milking personnel pushes the elongated arm member 14 in the second direction 20, exceeding the threshold force, the elongated arm 14 may be pivoted to the second pivotal position. In the second pivotal position the tension spring 100 biases the elongated in the second direction 20 similar to the biasing in the first direction 18.

Figure 7A:
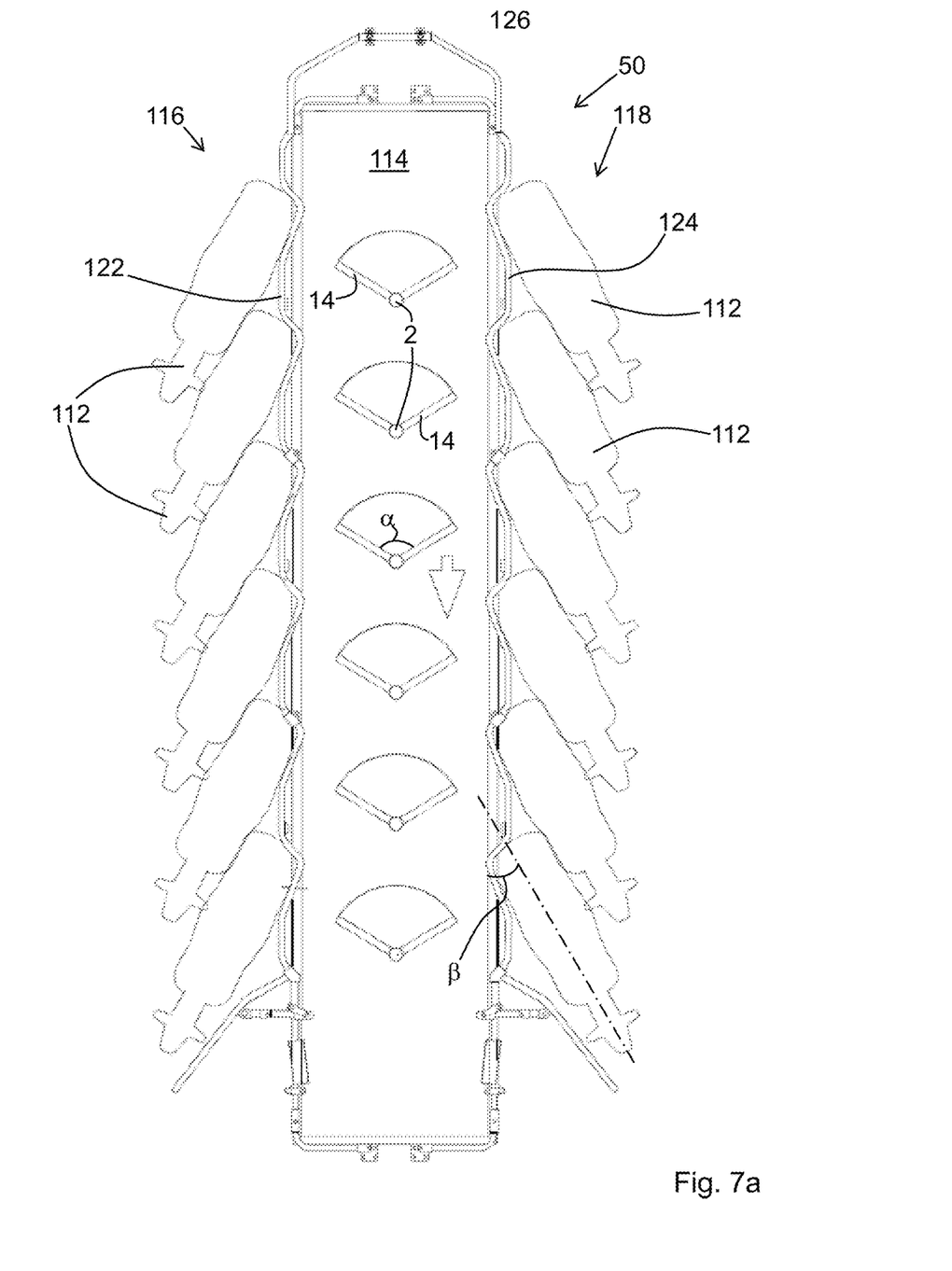
FIGS. 7a, 7b and 8 illustrate partial top views of milking parlours.
Figure 7B:
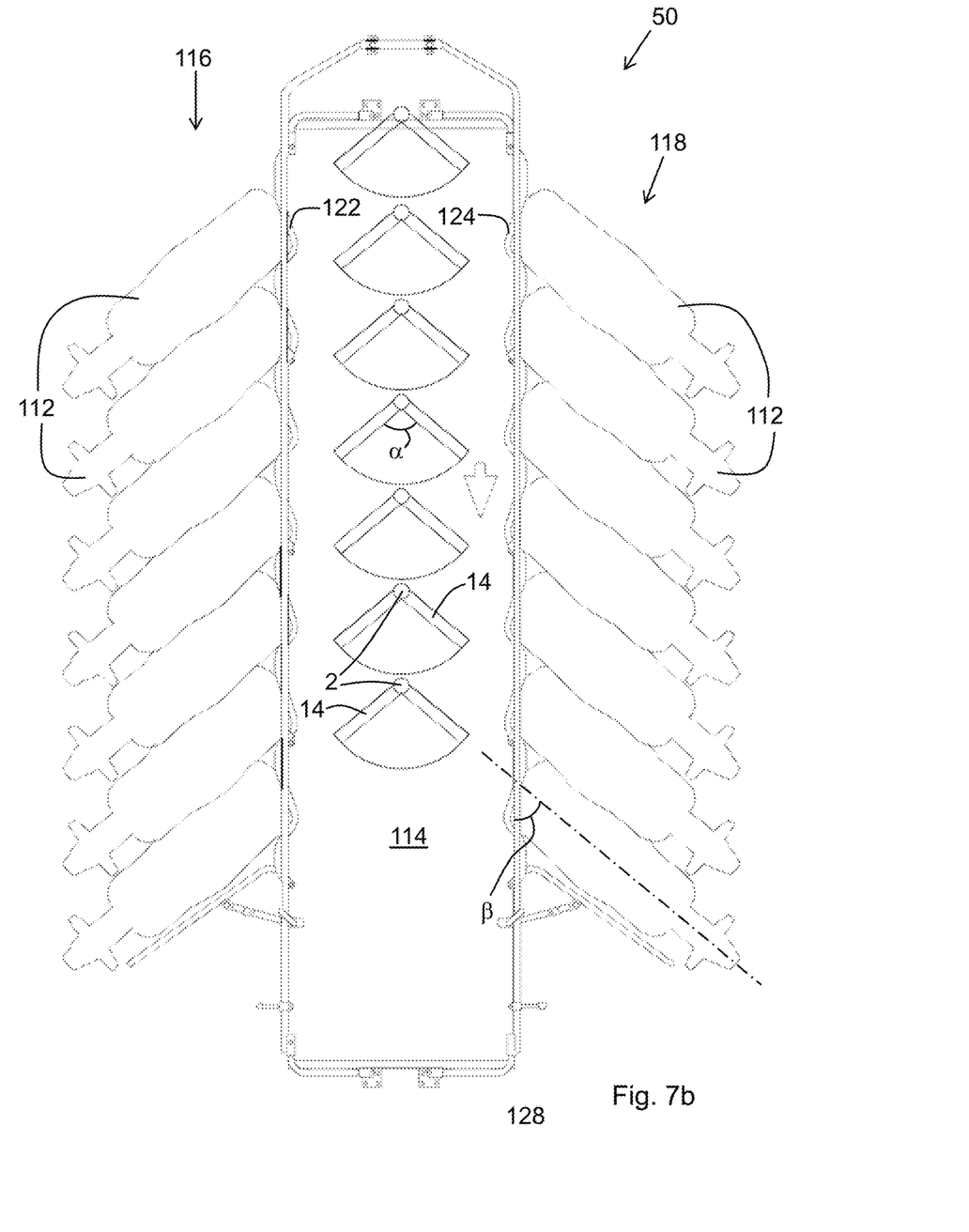

Each of FIGS. 7a and 7b illustrates a partial top view of a milking parlour 50 according to embodiments. The milking parlours 50 are so-called herringbone parlours, i.e. the animals 112 to be milked stand at an acute angle to an edge of a milking pit 114 of the milking parlour 50.

Each of the milking parlours 50 illustrated in FIGS. 7a and 7b comprises milking equipment (not shown), a milking pit 114, a first stalling arrangement 122 for holding at least one animal 112 during milking at a first side 116 of the milking pit 114, a second stalling arrangement 124 for holding at least one animal 112 at an opposite second side 118 of milking pit 114, and a supporting member (not shown) arranged centrally in the milking pit 114. The milking parlour 50 of FIG. 7a comprises in total six support arm assemblies 2 according to aspects and/or embodiments disclosed herein. The milking parlour 50 of FIG. 7b comprises in total seven support arm assemblies 2 according to aspects and/or embodiments disclosed herein. The number of support arm assemblies 2 may of course be smaller than six or larger than seven. The stationary arm suspension (not shown) of each support arm assembly 2 is arranged centrally in the milking pit 114 with the second pivot member (not shown) of the support assembly 2 connected to the supporting member.

The support arm assemblies 2 are schematically illustrated with each of the elongated arm members 14 in the first and second pivotal positions. An arc illustrates the pivoting of the elongated arm member 14 between each of the first and second pivotal positions.

The first and second stalling arrangements 122, 124 are herringbone stalling arrangements. The first and second abutment parts 66, 68 of each support arm assembly 2, see e.g. FIG. 4, are positioned to provide an angle α within a range of 90-150 degrees between well-defined first and second pivotal positions. In the embodiments of FIG. 7a the animals 112 stand at a 30 degree angle α to the edge of the milking pit 114 and an angle α between the first and second pivotal positions is approximately 120 degrees. In the embodiments of FIG. 7b the animals 112 stand at a 50 degree angle β to the edge of the milking pit 114 and an angle α between the first and second pivotal positions is approximately 100 degrees.

In the embodiments of FIG. 7a the teat cups of the milking equipment are attached to the teats of the animals 112 between a front leg and a rear leg of each animal 112. The elongated arm members 14 point generally towards an entrance end 126 of the milking parlour 50. In the embodiments of FIG. 7b the teat cups of the milking equipment are attached to the teats of the animals 112 between the rear legs of each animal 112. The elongated arm members 14 point generally towards an exit end 128 of the milking parlour 50.

Further reference is made to FIG. 3, in which in particular the supporting member 120 and the stationary arm suspension 8 are clearly shown.

Figure 8:
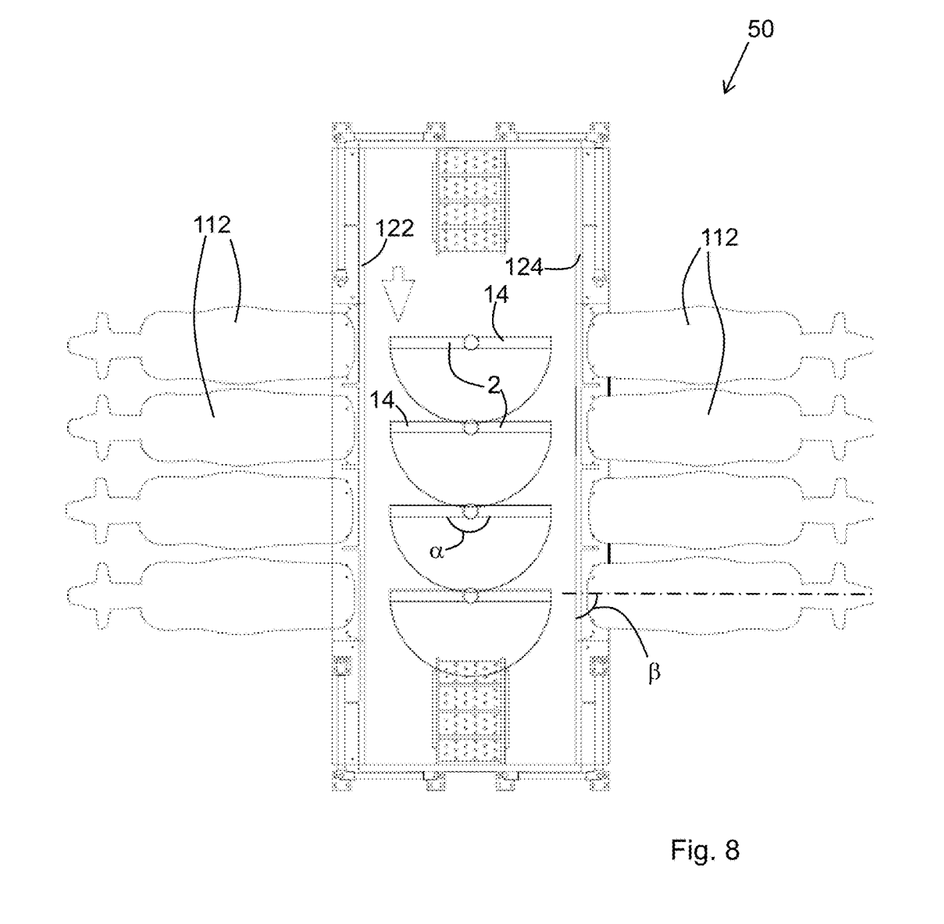

FIG. 8 illustrates a milking parlour 50 according to embodiments. The milking parlour 50 is a parallel milking parlour, i.e. the animals 112 to be milked stand at a right angle β to an edge of a milking pit 114 of the milking parlour 50. Accordingly, the first and second stalling arrangements 122, 124 of these embodiments are parallel stalling arrangements. First and second abutment parts 66, 68 of each support arm assembly 2, see e.g. FIG. 4, are positioned to provide an angle α of approximately 180 degrees between the first and second pivotal positions.

Other than that, the milking parlour 50 of these embodiments resembles the milking parlours 50 of the embodiments of FIGS. 3, 7a, and 7b.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims. Although the invention has been described with reference to example embodiments, many different alterations, modifications and the like will become apparent for those skilled in the art. Mentioned purely as an example, the threshold force in the first direction 18 or the second direction 20 required to pivot the elongated arm member 14 from the first pivotal position or the second pivotal position may be approximately 20 N applied to the distal end portion 24 of the elongated arm member 14. It is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A support arm assembly (2) for milking equipment, the support arm assembly (2) comprising:
    a pivotable support arm (6) comprising
        a first pivot member (12), and
        an elongated arm member (14) having a distal end portion (24) and a proximal end portion (26), the elongated arm member (14) being configured to support a milking cluster (28) of the milking equipment at the distal end portion (24), the first pivot member (12) being connected to the proximal end portion (26);
    a stationary arm suspension (8) configured to support the pivotable support arm (6), the stationary arm suspension (8) comprising a second pivot member (16), the first pivot member (12) and the second pivot member (16) interacting to permit the distal end portion (24) of the elongated arm member (14) to be pivoted in a first direction (18) and an opposite second direction (20) in a substantially horizontal plane; and
    a holding device (36) configured to maintain the elongated arm member (14) in a first pivotal position when the elongated arm member (14) is subjected to a pivotal force smaller than a first pivotal position threshold force in the first direction (18) or the second direction (20) and to prevent the elongated arm member (14) from being pivoted beyond the first pivotal position in the first direction (18).

2. The support arm assembly (2) according to claim 1, wherein the elongated arm member (14) is only able to be pivoted from the first direction (18) to the second direction 20.

3. The support arm assembly (2) according to claim 1, wherein the holding device comprises a stop mechanism (54) connected to the pivotable support arm (6) and a stop element (56) connected to the stationary arm suspension (8), the stop mechanism (54) being configured to interact with the stop element (56).

4. The support arm assembly (2) according to claim 3, wherein the stop mechanism (54) comprises a first abutment part (66) associated with the first pivotal position and a second abutment part (68) associated with a second pivotal position.

5. The support arm assembly (2) according to claim 4, wherein the first and second abutment parts (66, 68) are individually positionable along the first and second directions (18, 20).

6. The support arm assembly (2) according to claim 3, wherein the holding device (36) comprises a tension spring (100) connected to the pivotable support arm (6) and the stationary arm suspension (8),
    the stop mechanism (54) abuts against the stop element (56) in the first pivotal position,
    the tension spring (100) biases the pivotable support arm (6) in the first direction (18), and
    a biasing force provided by the tension spring (100) in the first direction (18) corresponds to the threshold force.

7. The support arm assembly (2) according to claim 1, wherein the holding device (36) is configured to release the elongated arm member (14) from the first pivotal position when the elongated arm member (14) is subjected to a pivotal force higher than the threshold force in the second direction (20).

8. The support arm assembly (2) according to claim 1, wherein the holding device (36) comprises a first holding element (38) and a second holding element (40), the first holding element (38) being connected to one of the pivotable support arm (6) and the stationary arm suspension (8) and comprising a magnet member (42), the second holding element (40) being connected to the other of the pivotable support arm (6) and the stationary arm suspension (8) and comprising a magnetic material member (44),
    the magnetic member abuts against the magnetic material member (44) in the first pivotal position, and
    an attraction force between the magnet member (42) and the magnetic material member (44) corresponds to the threshold force.

9. The support arm assembly (2) according to claim 1, wherein the holding device (36) comprises a first holding element (38) and a second holding element (40), the first holding element (38) being connected to one of the pivotable support arm (6) and the stationary arm suspension (8) and comprising a resilient member (80), the second holding element (40) being connected to the other of the pivotable support arm (6) and the stationary arm suspension (8) and comprising an engagement member (82),
    the resilient member (80) engages with the engagement member (82) or the engagement member (82) engages with the resilient member (80) in the first pivotal position, and
    an engaging force between the resilient member (80) and the engagement member (82) corresponds to the threshold force.

10. The support arm assembly (2) according to claim 1, wherein the holding device (36) further prevents the elongated arm member (14) from being pivoted beyond a second pivotal position in the second direction (20), and
    the holding device (36) is configured to maintain the elongated arm member (14) in the second pivotal position when the elongated arm member (14) is subjected to a pivotal force in the first direction (18) smaller than a second pivotal position threshold force, the second pivotal position threshold force being a force at which the holding device (36) releases the elongated arm member (14) from the second pivotal position.

11. A milking parlor (50) comprising:
milking equipment;
a milking pit (114);
a first stalling system (122) configured to hold at least one animal during milking at a first side (116) of the milking pit (114);
a second stalling system (124) configured to hold at least one animal at an opposite second side (118) of the milking pit (114);
a supporting member (120) disposed centrally in the milking pit (114); and
the support arm assembly (2) according to claim 1,
wherein the stationary arm suspension (8) is disposed centrally in the milking pit (114) with the second pivot member (16) connected to the supporting member (120).

12. The milking parlor (50) according to claim 11, wherein the holding device (36) of the support arm assembly (2) comprises a stop mechanism (54) connected to the pivotable support arm (6) and a stop element (56) connected to the stationary arm suspension (8), the stop mechanism (54) being configured to interact with the stop element (56), the stop mechanism (54) comprising a first abutment part (66) associated with the first pivotal position and a second abutment part (68) associated with a second pivotal position,
the first and second stalling systems (122, 124) are herringbone stalling systems, and
the first and second abutment parts (66, 68) are positioned to provide an angle (a) within a range of 90-150 degrees between the first and second pivotal positions.

13. The milking parlor (50) according to claim 12, wherein the first and second abutment parts (66, 68) are individually positionable along the first and second directions (18, 20).

14. The milking parlor (50) according to claim 11, wherein the holding device (36) of the support arm assembly (2) comprises a stop mechanism (54) connected to the pivotable support arm (6) and a stop element (56) connected to the stationary arm suspension (8), the stop mechanism (54) being configured to interact with the stop element (56), the stop mechanism (54) comprising a first abutment part (66) associated with the first pivotal position and a second abutment part (68) associated with a second pivotal position,
the first and second stalling systems (122, 124) are parallel stalling systems, and
the first and second abutment parts (66, 68) are positioned to provide an angle (a) of approximately 180 degrees between the first and second pivotal positions.

15. The milking parlor (50) according to claim 14, wherein the first and second abutment parts (66, 68) are individually positionable along the first and second directions (18, 20).

16. A support arm assembly (2) for milking equipment, the support arm assembly (2) comprising:
a pivotable support arm (6) comprising
a first pivot member (12), and
an elongated arm member (14) having a distal end portion (24) and a proximal end portion (26), the elongated arm member (14) being configured to support a milking cluster (28) of the milking equipment at the distal end portion (24), the first pivot member (12) being connected to the proximal end portion (26);
a stationary arm suspension (8) configured to support the pivotable support arm (6), the stationary arm suspension (8) comprising a second pivot member (16), the first pivot member (12) and the second pivot member (16) interacting to permit the distal end portion (24) of the elongated arm member (14) to be pivoted in a first direction (18) and an opposite second direction (20) in a substantially horizontal plane; and
a holding device (36) configured to maintain the elongated arm member (14) in a first pivotal position when the elongated arm member (14) is subjected to a pivotal force larger than a threshold force in the first direction (18) such that the elongated arm member (14) is securely positioned in the first pivotal position.

* * * * *